(12) United States Patent
Kowarz

(10) Patent No.: US 7,274,500 B2
(45) Date of Patent: Sep. 25, 2007

(54) DISPLAY SYSTEM INCORPORATING TRILINEAR ELECTROMECHANICAL GRATING DEVICE

(75) Inventor: Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 756 days.

(21) Appl. No.: 10/726,459

(22) Filed: Dec. 3, 2003

(65) Prior Publication Data

US 2006/0152436 A1  Jul. 13, 2006

(51) Int. Cl.
 *G02F 1/03* (2006.01)
(52) U.S. Cl. .................. 359/242; 359/245; 359/247
(58) Field of Classification Search .............. 359/242, 359/238, 245, 246, 247, 259, 263, 572, 573, 359/569, 726, 727, 729, 730, 731, 732, 733, 359/720, 728, 737
 See application file for complete search history.

(56) References Cited

U.S. PATENT DOCUMENTS

| | | | | |
|---|---|---|---|---|
| 5,311,360 A | | 5/1994 | Bloom et al. ................ | 359/572 |
| 5,982,553 A | | 11/1999 | Bloom et al. ................ | 359/627 |
| 6,215,579 B1 | * | 4/2001 | Bloom et al. ................ | 359/298 |
| 6,307,663 B1 | | 10/2001 | Kowarz ....................... | 359/231 |
| 6,411,425 B1 | | 6/2002 | Kowarz et al. .............. | 359/291 |
| 6,476,848 B2 | | 11/2002 | Kowarz et al. .............. | 347/255 |
| 6,567,217 B1 | * | 5/2003 | Kowarz et al. .............. | 359/618 |
| 6,724,125 B2 | * | 4/2004 | Hung et al. .................. | 310/309 |
| 7,170,567 B2 | * | 1/2007 | Ouchi et al. ................. | 348/750 |
| 2005/0111074 A1 | * | 5/2005 | Huibers ....................... | 359/291 |

FOREIGN PATENT DOCUMENTS

EP  1 427 220 A1  9/2004

OTHER PUBLICATIONS

"Invited Paper: Grating Light Valve™ Technology: Update and Novel Applicaitons" by D.T. Amm, R.W. Corrigan. 1998 SID International Symposium Digest of Technical Papers. Anaheim, CA, May 17-22, 1998. SID International Symposium Digest of Technical Papers, Santa Ana, CA: SID, US, vol. 29, 1998, pp. 29-32.

"Flexible micromirror linear array for high resolution projection display" by Francis Picard et al. MOEMS Display and Imaging Systems. Proceedings of SPIE, vol. 4985 (2003).

* cited by examiner

*Primary Examiner*—Timothy Thompson
(74) *Attorney, Agent, or Firm*—Stephen H. Shaw

(57) ABSTRACT

A display system comprises a light modulator having at least three linear arrays of light modulating devices on a common substrate, at least one light source producing at least three colors of light for illuminating the at least three linear arrays, a lens for creating line images of the at least three linear arrays on a display surface, and a scanning mirror for scanning the line images to create a two-dimensional image on the display surface.

28 Claims, 9 Drawing Sheets

DISPLAY SYSTEM INCORPORATING TRILINEAR ELECTROMECHANICAL GRATING DEVICE

FIELD OF THE INVENTION

This invention relates to a display system with a linear array of electromechanical grating devices that is scanned in order to generate a two-dimensional image. More particularly, the invention relates to a display system containing a trilinear array of electromechanical grating devices.

BACKGROUND OF THE INVENTION

Spatial light modulators based on electromechanical grating devices are important for a wide range of applications, including display, data storage, spectroscopy and printing. Such systems require large numbers of individually addressable devices in either a linear or area array, with over a million addressable devices desirable for an area modulator array in a high-quality display.

Linear arrays are particularly advantaged over their area array counterparts by virtue of higher resolution, reduced cost, and simplified illumination optics. Of particular interest: linear arrays are more suitable modulators for laser light than are their two-dimensional counterparts. Grating Light Valve (GLV) linear arrays, as described in U.S. Pat. No. 5,311,360 (Bloom et al.) are one earlier type of linear array that offers a workable solution for high-brightness imaging using laser sources, for example. Another experimental type of linear array just recently disclosed and in early development stages is the flexible micromirror linear array, as described in the article "Flexible micromirror linear array for high resolution projection display" by Francis Picard, et al. in *MOEMS Display and Imaging Systems, Proceedings of SPIE* Vol. 4985 (2003). The prototype flexible micromirror linear array described in the Picard et al. article employs a line of reflective "microbridges" which are individually switched to modulate light to form a linear image.

Recently, an electromechanical conformal grating device consisting of ribbon elements suspended above a substrate by a periodic sequence of intermediate supports was disclosed by Kowarz in U.S. Pat. No. 6,307,663, issued on Oct. 23, 2001, entitled "SPATIAL LIGHT MODULATOR WITH CONFORMAL GRATING DEVICE." The electromechanical conformal grating device is operated by electrostatic actuation, which causes the ribbon elements to conform around the support substructure, thereby producing a grating. The device of '663 has more recently become known as the conformal GEMS device or, more simply, GEMS device, with GEMS standing for grating electromechanical system. The GEMS device possesses a number of attractive features. It provides high-speed digital light modulation with high contrast and good efficiency. In addition, in a linear array of GEMS devices, the active region is relatively large and the grating period is oriented perpendicular to the array direction. This orientation of the grating period causes diffracted light beams to separate in close proximity to the linear array and to remain spatially separated throughout most of an optical system and enables a simpler optical system design with smaller optical elements.

Display systems based on a linear array of GEMS devices were described by Kowarz et al. in U.S. Pat. No. 6,411,425, entitled "ELECTROMECHANICAL GRATING DISPLAY SYSTEM WITH SPATIALLY SEPARATED LIGHT BEAMS," issued Jun. 25, 2002 and by Kowarz et al. in U.S. Pat. No. 6,476,848, entitled "ELECTROMECHANICAL GRATING DISPLAY SYSTEM WITH SEGMENTED WAVEPLATE," issued Nov. 5, 2002. Display systems based on GLV devices are disclosed in U.S. Pat. No. 5,982,553, entitled "DISPLAY DEVICE INCORPORATING ONE-DIMENSIONAL GRATING LIGHT-VALVE ARRAY" issued to Bloom et al. on Nov. 9, 1999.

Current GLV and GEMS color display system architectures employ three separate color paths, Red, Green, and Blue (RGB), each color path provided with a linear array of electromechanical grating devices. Each linear array of electromechanical grating devices modulates its component red, green, or blue laser light. The resulting modulated light beams are then combined onto the same output axis to provide a full-color image that is then scanned to the display screen. Referring to FIG. 1, there is shown a prior art display system 10 using three separate optical paths in this way.

For red color modulation, a red light source 70r, typically a laser, provides illumination that is conditioned through a spherical lens 72r and a cylindrical lens 74r and directed towards a turning mirror 82r. Light reflected from turning mirror 82r is modulated by diffraction at an electromechanical grating light modulator 85r. Modulated diffracted light from electromechanical grating light modulator 85r is diffracted past turning mirror 82r and to a color combiner 100, such as an X-cube or other dichroic combiner. The modulated light from color combiner 100 is then directed by a lens 75, through an optional cross-order filter 110 (not shown), to a scanning mirror 77 for projection onto a display surface 90. Green color modulation uses a similar set of components for providing light to color combiner 100, with a green light source 70g, typically a laser, providing illumination through a spherical lens 72g and a cylindrical lens 74g and directed towards a turning mirror 82g. Light reflected from turning mirror 82g is modulated by diffraction at an electromechanical grating light modulator 85g. Modulated diffracted light from electromechanical grating light modulator 85g is diffracted past turning mirror 82g and to color combiner 100. Similarly, blue light source 70b, typically a laser, provides illumination through a spherical lens 72b and a cylindrical lens 74b and directs light towards a turning mirror 82b. Light reflected from turning mirror 82b is modulated by diffraction at an electromechanical grating light modulator 85b, diffracted past turning mirror 82b and to color combiner 100.

In order to maintain precise color registration with the system of FIG. 1, each of the three linear arrays, electromechanical grating light modulators 85r, 85g, and 85b, must be aligned to each other, to within sub-pixel tolerances. This precision of alignment is difficult to obtain. Moreover, this alignment must prove stable so that it can be maintained over a range of temperatures and other environmental conditions, such as shock and vibration. Color combiner 100 is a particularly costly component and can be the source of undesirable image aberrations.

One design solution that eliminates the color channel alignment problem is color-sequential operation, whereby a single electromechanical grating light modulator serves to modulate each color light in sequence. This type of system is described, for example, in the disclosure of U.S. Pat. No. 6,411,425 entitled "Electromechanical Grating Display System with Spatially Separated Light Beams" to Kowarz et al. (see cols. 9-10). However, as noted in the '425 Kowarz et al. disclosure, color-sequential techniques, by modulating only one color at a time, effectively waste two-thirds of the available light. Thus, although color-sequential solutions minimize alignment concerns, these solutions have performance drawbacks.

Thus, it can be seen that there would be advantages to a projection solution that provides the performance benefits of electromechanical grating light modulators without requiring frequent adjustment of alignment for each color path or requiring complex and costly mounting apparatus that would be able to maintain alignment over a wide range of operating conditions, and that provides a compact, low-cost apparatus, without the requirement for a color-combining prism.

SUMMARY OF THE INVENTION

The present invention is directed to overcoming one or more of the problems set forth above. Briefly summarized, according to one aspect, the present invention provides a display system, comprising:

a) a light modulator having at least three linear arrays of light modulating devices on a common substrate;

b) at least one light source producing at least three colors of light for illuminating the at least three linear arrays;

c) a lens for creating line images of the at least three linear arrays on a screen; and d) a scanning mirror for sweeping the line images to create a two-dimensional image.

It is a feature of the present invention that it uses arrays of electromechanical grating devices that are fabricated on a common substrate.

It is an advantage of the present invention that it provides a full-color display system using arrays of electromechanical grating devices that does not require alignment of individual color paths for modulated light.

It is an advantage of the present invention that it provides a full-color display system using arrays of electromechanical grating devices with a reduced number of components, allowing design of a more compact and lower cost apparatus than provided by earlier designs. With its reduced number of components and minimized requirements for adjustment, the apparatus of the present invention provides a robust solution for imaging using electromechanical grating array devices.

It is a further advantage of the present invention that it eliminates the need for a color combining cube in the path of modulated light.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 4b is a side view showing the arrangement of a control trace used in the embodiment of FIG. 4a;

To facilitate understanding, identical reference numerals have been used, where possible, to designate identical elements that are common to the figures.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the description that follows, components specific to a single color path may be more particularly identified with a letter appended to the part number. Where used, letters correspond to color paths; for example, "r" is appended for red, "b" for blue, "g" for green.

Figure 2:
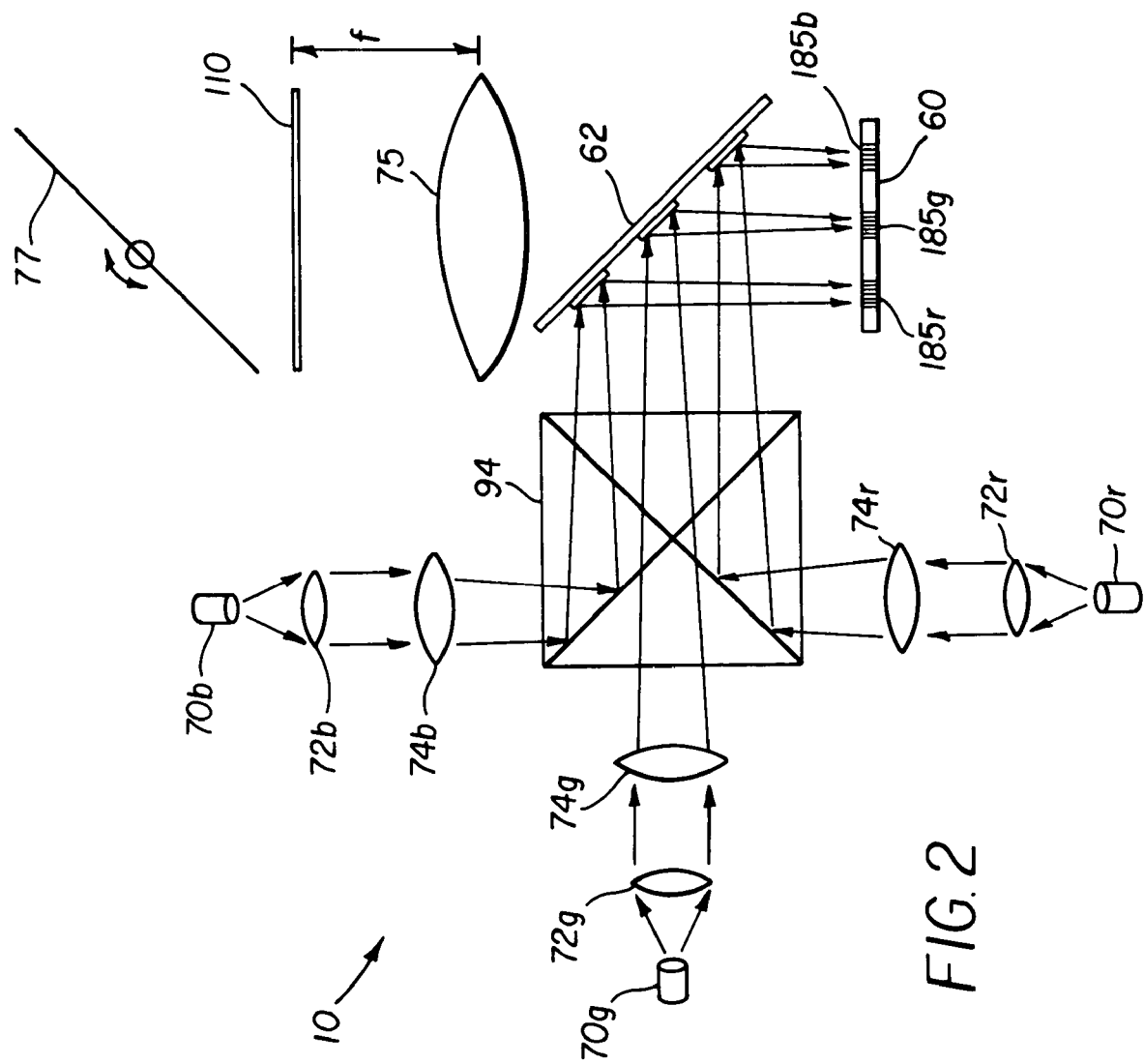
FIG. 2 is a schematic block diagram showing the arrangement of color modulation components in one embodiment of the present invention.
Figure 8:
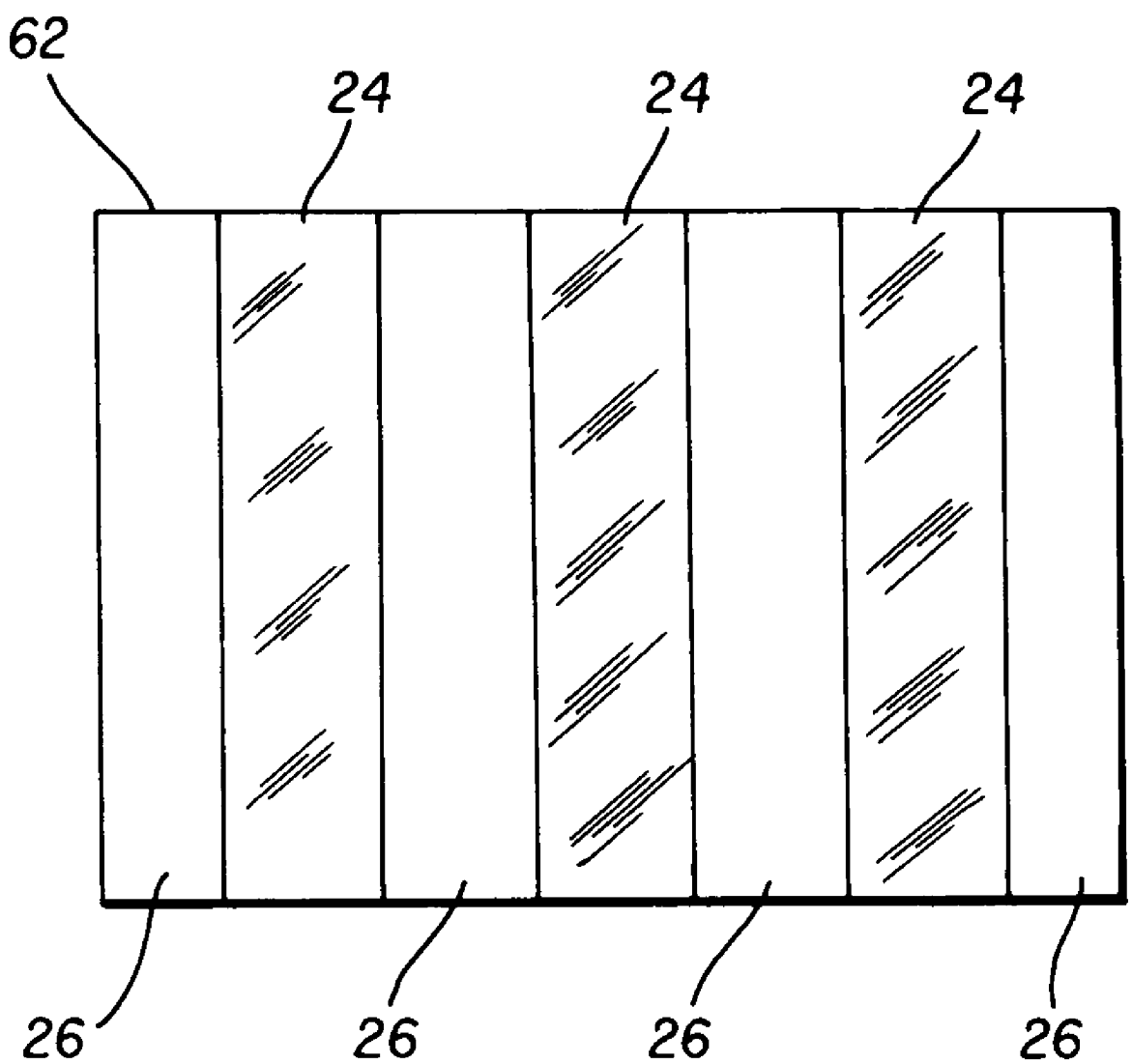

Referring to FIG. 2, there is shown an embodiment of display system 10 of the present invention, employing a trilinear array of light modulating devices 60 for modulating light from red, green, and blue light sources 70r, 70g, and 70b. A dichroic combiner 94 is provided in the illumination path, for directing illumination from each of red, green, and blue light sources 70r, 70g, and 70b toward a patterned micromirror assembly 62. Patterned micromirror assembly 62, in turn, directs the illumination for each color to a corresponding linear array of light modulating devices 185r, 185g, or 185b in trilinear array of light modulating devices 60. Referring to FIG. 8, there is shown an arrangement of patterned micromirror assembly 62 for one embodiment. An arrangement of reflective segments 24 is provided, with transmissive regions 26 spaced between reflective segments 24. Reflective segments 24 may be fabricated using deposition of reflective metallic materials such as aluminum or silver, applied using shadow mask techniques or other suitable fabrication techniques. Transmissive regions 26 may be fabricated in a number of ways, such as applying an anti-reflective coating onto a glass substrate, for example.

In a preferred embodiment, trilinear array of light modulating devices 60 is formed from three separate electromechanical grating light modulator sections, aligned on the same substrate, each electromechanical grating light modulator section corresponding to a linear array of light modulating devices 185r, 185g, or 185b. In one embodiment, linear array of light modulating devices 185r, 185g, and 185b are GEMS devices. Alternately, any one or all of linear array of light modulating devices 185r, 185g, or 185b could be a GLV device or a flexible micromirror linear array, as described in the Picard et al. article noted in the background section hereinabove. As is well-known to those skilled in the art, the specific layout and design of supporting optical elements in display system 10 must be tailored to the specific type of light modulating device that is used.

Figure 1:
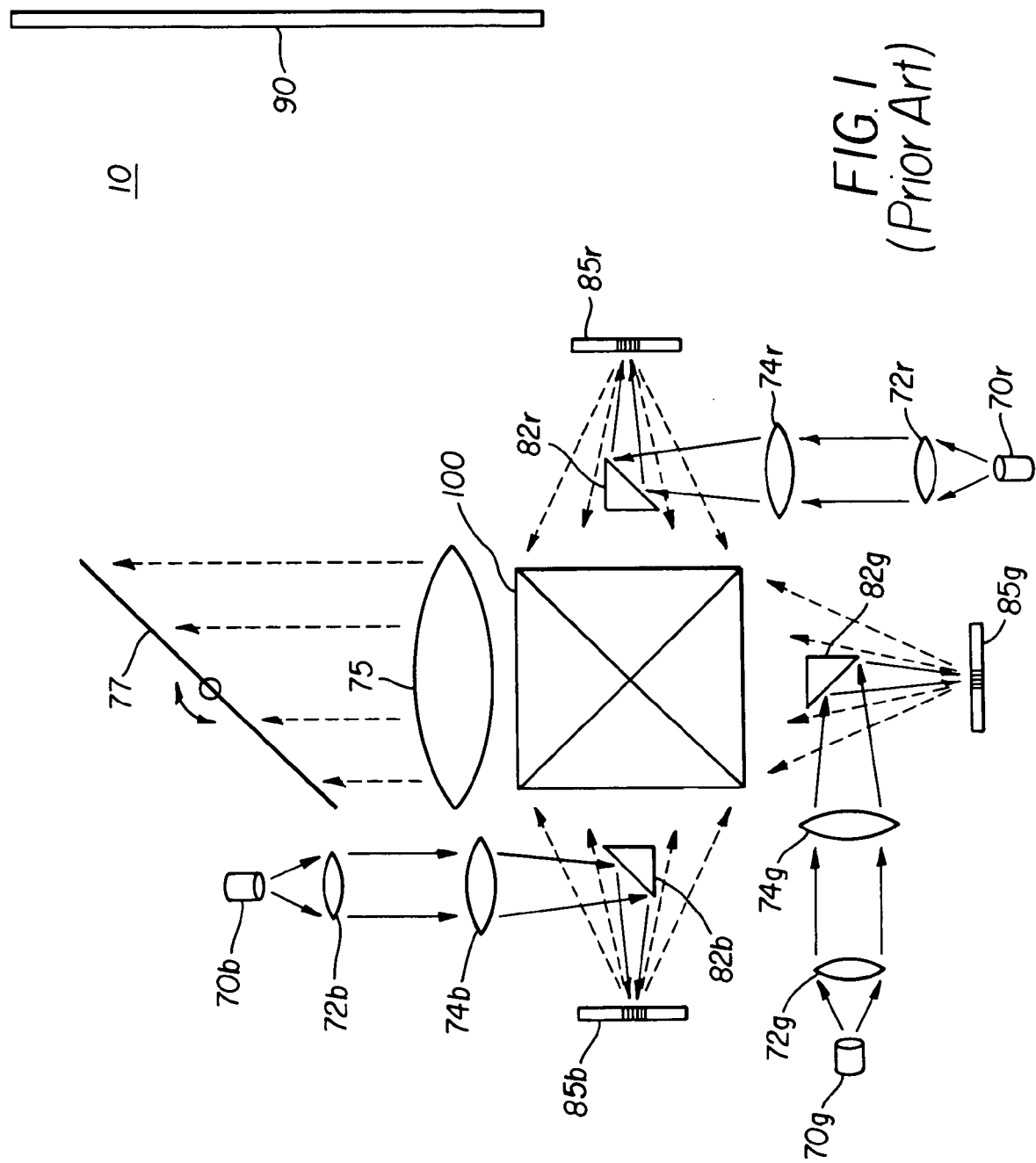
FIG. 1 is a schematic block diagram showing a prior art display apparatus employing an electromechanical grating light modulator in each of three color modulation channels.

Referring again to FIG. 2, reflective segments 24 of patterned micromirror assembly 62 are angularly aligned with each linear array of light modulating devices 185r, 185g, and 185b in display system 10. Modulated light passes through the glass substrate of patterned micromirror assembly 62 and is then directed through lens 75 and optional cross-order filter 10, placed at focal distance f from lens 75, to scanning mirror 77 for forming the final color image on display surface 90, as was described with reference to the prior art apparatus of FIG. 1. It is worthwhile to observe that dichroic combiner 94 can be an X-cube or X-prism or similar device. However, in contrast to the arrangement of FIG. 1, this component is in the illumination path, rather than in the path of modulated light. Thus, there is wider tolerance for fabrication of dichroic combiner 94 of FIG. 2 than for the conventional X-prism used as color combiner 100 in FIG. 1, allowing this component to have significantly lower cost. For example, an X-prism used as color combiner 100 would be smaller than an X-prism used for modulated light. Additional cost benefits relate to the overall optical performance requirements for projection optics. With the arrangement of FIG. 1, for example, lens 75 requires a longer back focal length and must provide acceptable imaging through color combiner 100, since color combiner 100 is in the object path of lens 75. Moving the color-combining function to the illumination path thus simplifies lens 75 design and cost.

Other types of combining components could alternately be used in the illumination path; typically, these components employ an arrangement of dichroic surfaces. While some amount of alignment is needed for red, green, and blue light sources 70r, 70g, and 70b, the arrangement of FIG. 2 allows some tolerance for imperfect alignment.

It is instructive to observe that the three linear array of light modulating devices 185r, 185g, or 185b provide line images that are spatially separated. This necessitates incorporating a time delay of some duration into the display data stream, so that lines of the output image are written at the appropriate time, as paced by scanning hardware and depending on spacing between the three linear array of light modulating devices 185r, 185g, or 185b. At any one moment, for example, linear array of light modulating devices 185r may be writing a line (line n) of the output image; linear array of light modulating devices 185g may be writing an adjacent or nearby line (line (n+1) or line (n+2)) of the output image; and linear array of light modulating devices 185b may be writing a further line of the output image. It may not be feasible or desirable to write adjacent lines of different colors at precisely the same time; instead, some amount of timing delay would be required. In any case, some amount of timing offset is needed in order to compensate for spacing between the three linear array of light modulating devices 185r, 185g, or 185b.

Figure 3:
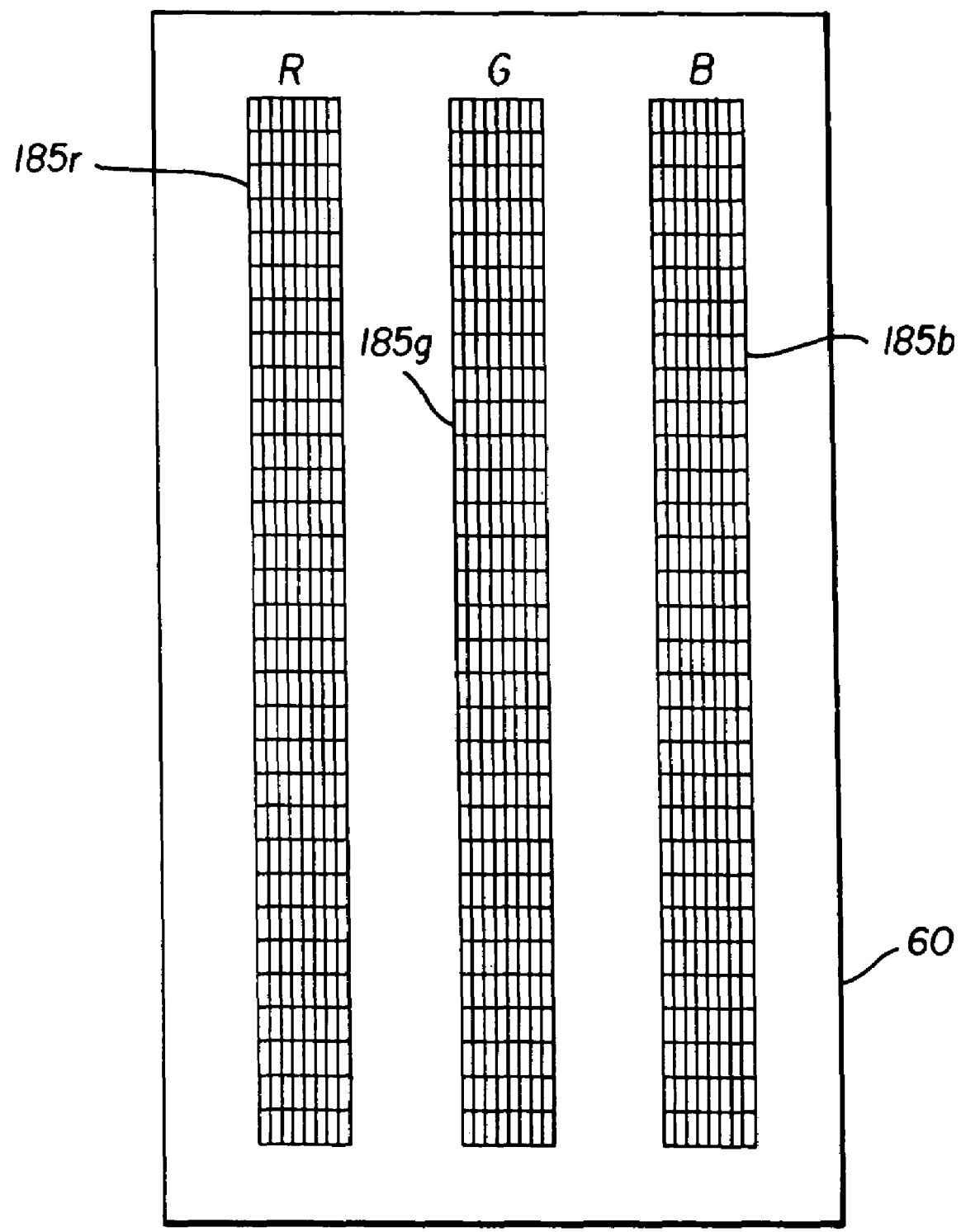
FIG. 3 is a plan view showing three arrays of electromechanical grating light modulators on a single substrate according to one embodiment.

Referring now to FIG. 3, there is shown a plan view representation of linear arrays of light modulating devices 185r, 185g, and 185b on trilinear array of light modulating devices 60 in a simple embodiment. In operation, each linear array of light modulating devices 185r, 185g, and 185b operates independently, having its own control signals, routed from driver circuitry (not shown in FIG. 2).

Options for Control Signal Routing

Figure 4A:
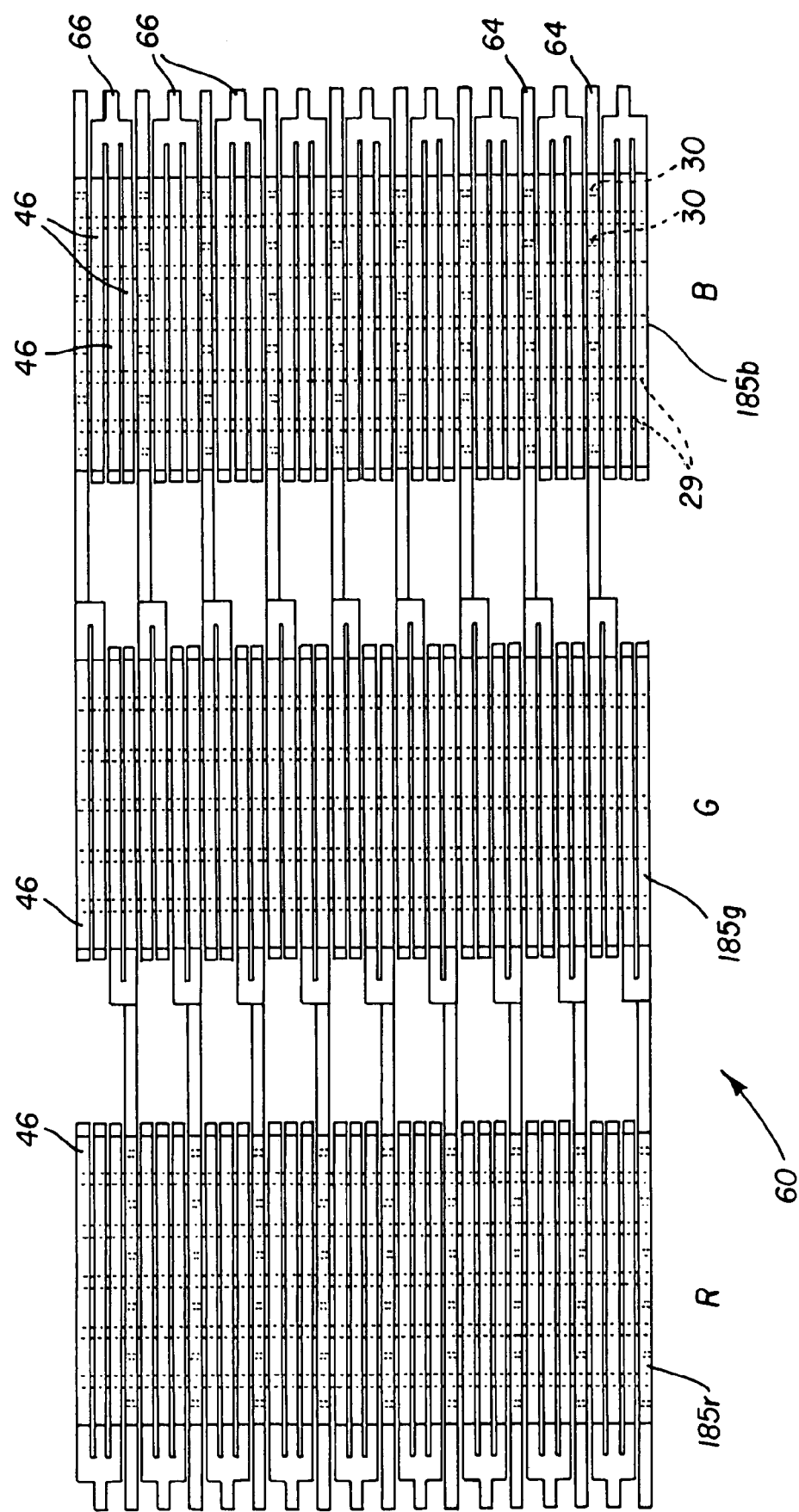
FIG. 4a is plan view showing routing of control traces for three arrays of electromechanical grating light modulators according to another embodiment.
Figure 4B:
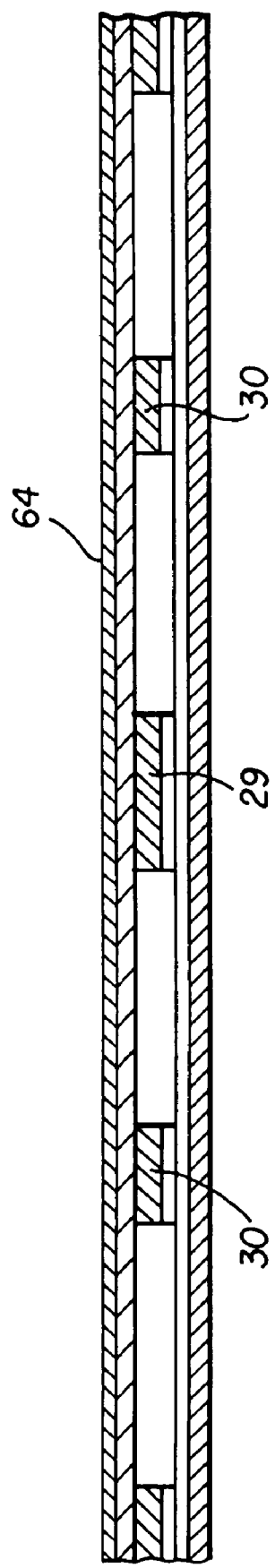

In the embodiment of FIG. 3, there are difficulties in properly routing control signals to green linear array of light modulating devices 185g, shown in the center, due to its position between red and blue linear arrays of light modulating devices 185r and 185b, respectively. FIG. 4a shows an arrangement of control traces 64 and contacts 66 that could be used to provide this electrical connection in one embodiment. In the embodiments of FIGS. 4a and 4b, linear arrays of light modulating devices 185r, 185g, and 185b are depicted as GEMS devices. Each set of ribbon elements 46 has a corresponding contact 66 used for activation. Interspersed with ribbon elements 46 in the outer red and blue linear array of light modulating devices 185r and 185b are control traces 64 that provide pass-through control signals for green linear array of light modulating devices 185g. Ribbon elements 46 are provided with underlying supports 29, as was described in U.S. Pat. No. 6,307,663, cited earlier. Control traces 64 are provided with additional retainers 30, as shown in FIG. 4a and in the side view of FIG. 4b, so that these structures do not bend and thereby unintentially act as an active part of the optical grating for outer red and blue linear array of light modulating devices 185r and 185b. This arrangement, using both retainers 30 and supports 29 for control traces, helps to minimize cross-talk between color channels.

The arrangement of FIGS. 4a and 4b is workable in particular because the relative resolution of red, green, and blue modulated light need not be the same. As is well known in the imaging arts, it is most important for the green modulated light to have high resolution. Lower resolution of the other colors, particularly of blue, is acceptable and has little impact on image quality. In FIG. 4a, for example, the resolution of green linear array of light modulating devices 185g is higher than that of red or blue linear array of light modulating devices 185r or 185b.

Figure 5:
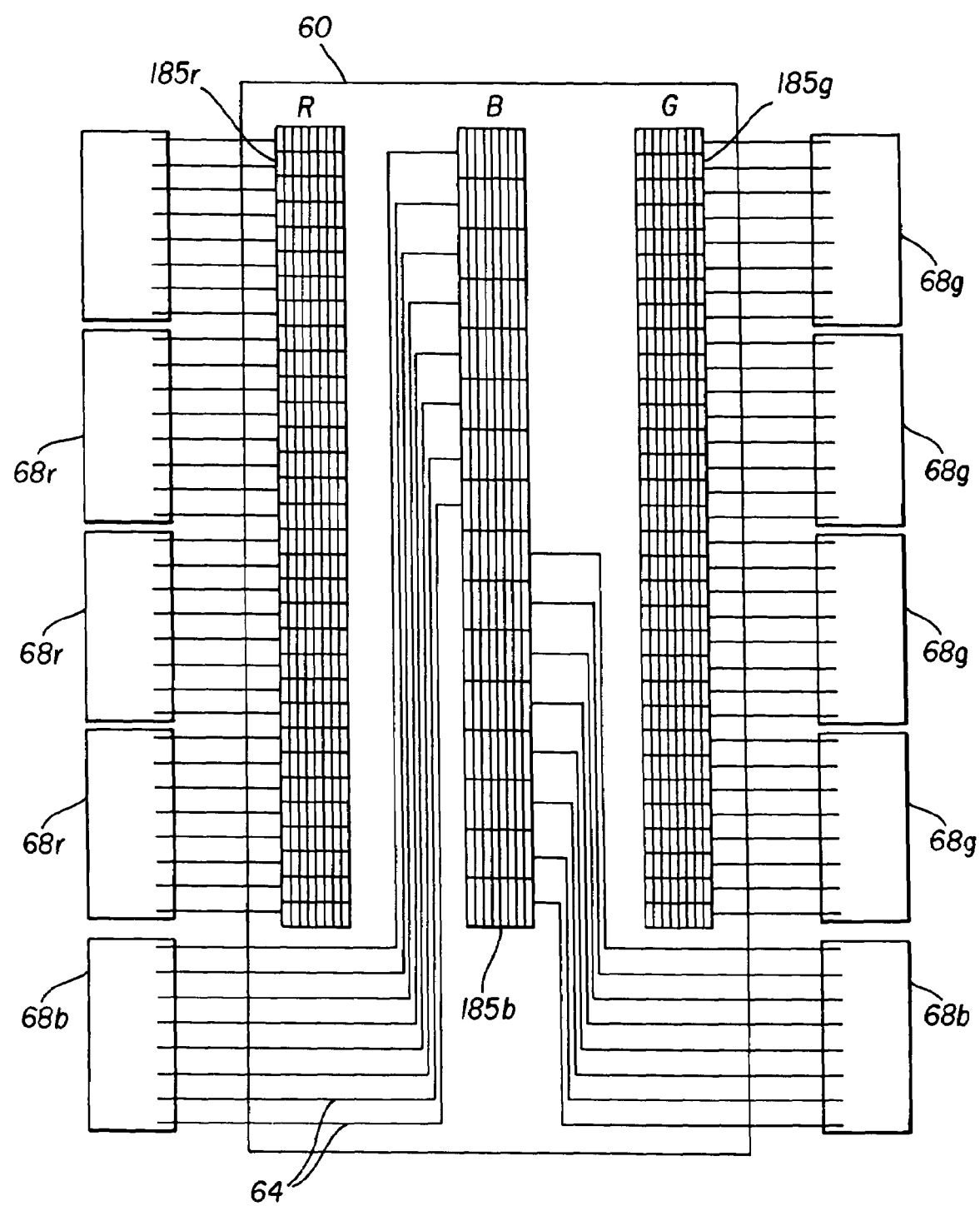
FIG. 5 is a plan view showing a scheme for routing of control traces from driver circuits for three arrays of electromechanical grating light modulators according to another embodiment.

Using a lower resolution value for blue, the arrangement shown in FIG. 5 rearranges the relative positions of linear array of light modulating devices 185r, 185g, and 185b from that of FIG. 4a. In FIG. 5, blue linear array of light modulating devices 185b has lower resolution and is positioned between red and green linear array of light modulating devices 185r and 185g. Red, green, and blue driver chips 68r, 68g, and 68b can then route signal lines using control traces 64 for providing electrical connection in a simple pattern as shown. Because blue linear array of light modulating devices 185b has lower resolution, fewer control traces 64 are needed for this middle section of trilinear array of light modulating devices 60.

In a preferred embodiment for use with an HDTV system having 1080×1920 resolution, the following dimensions are illustrative:

540 blue pixels (half the number of green pixels and of red pixels)

3 um per line/1 um spacing for control traces 64

135×4 um=540 um space requirement for control traces 64 to blue pixels, plus additional margin.

Alternate Embodiments for Display System 10

Figure 6:
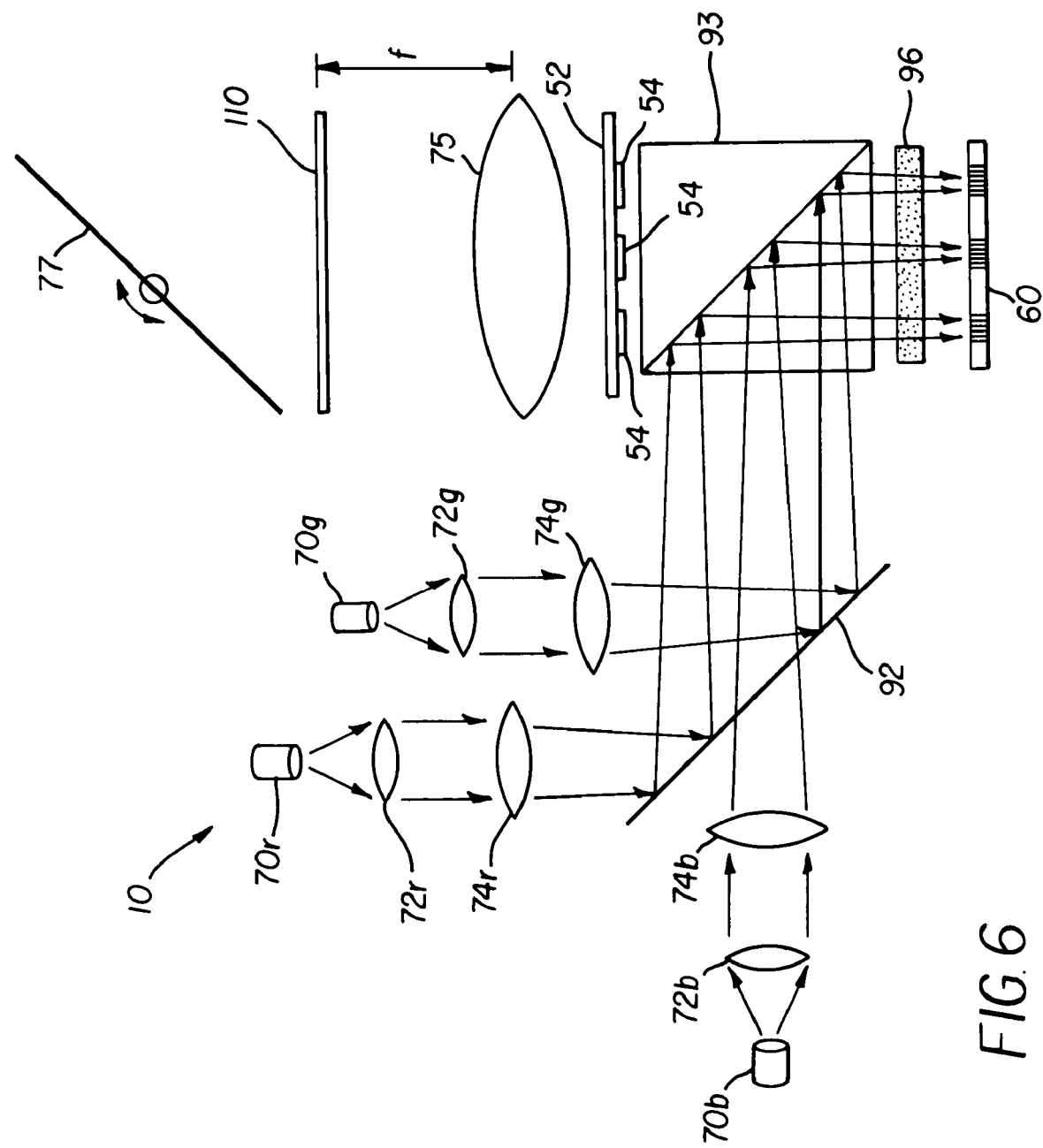
FIG. 6 is a schematic block diagram showing an arrangement of color modulation components in an alternate embodiment of the present invention.

Referring to FIG. 6, there is shown an alternate embodiment for display system 10 using a combination with a dichroic combiner 92, an achromatic polarizing beamsplitter 93, an achromatic quarter waveplate 96, and a patterned stop assembly 52, having a stop 54 for each modulated light path (rather than having reflective segments 24 as does patterned micromirror assembly 62). Here, dichroic combiner 92 provides a single surface for reflecting red and green light and transmitting blue light towards polarizing beamsplitter 93. Achromatic quarter waveplate 96 could alternately be a multiorder quarter wave plate. The embodiment of FIG. 6 effectively de-couples the input path (illumination) from the output path (modulated light), making the arrangement of FIG. 6 advantageous over the arrangement of FIG. 2, and easing tolerance requirements. However, both polarization beamsplitter 93 and achromatic quarter waveplate 96 are more costly with this arrangement.

Figure 7:
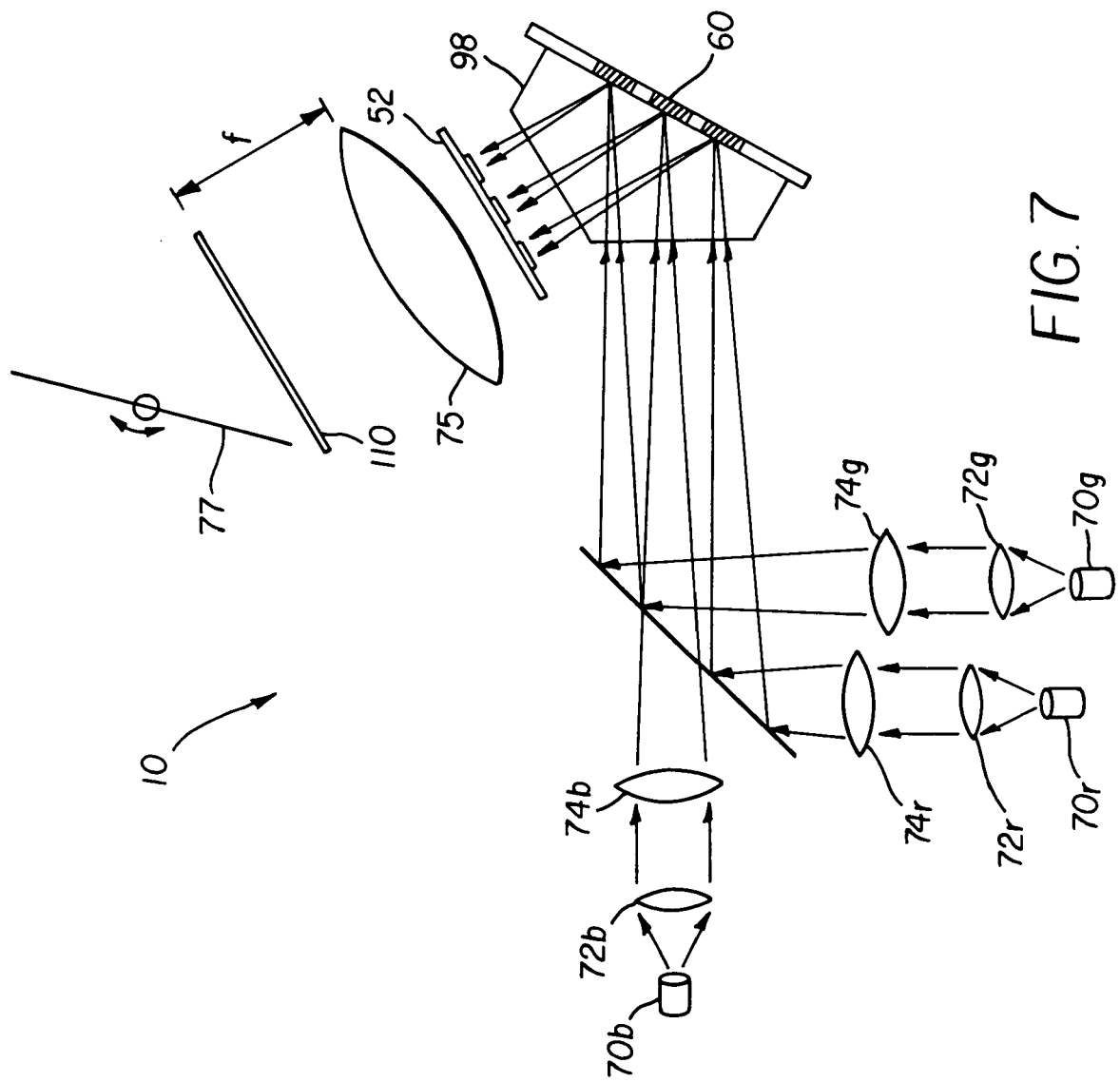
FIG. 7 is a schematic block diagram showing an arrangement of color modulation components in another alternate embodiment of the present invention, employing a cover prism as an alternative to a cover plate; and, FIG. 8 is a plan view of a patterned micromirror used in some embodiments of the present invention.

Referring to FIG. 7, there is shown another alternate embodiment having advantages similar to the embodiment of FIG. 6 and eliminating the need for both polarization beamsplitter 93 and achromatic quarter waveplate 96, relatively expensive components. Here, illumination is incident to trilinear array of light modulating devices 60 at an oblique angle. A cover prism 98, with the arrangement of surfaces as shown in FIG. 7, serves to eliminate the requirement for a separate cover glass near the surface of trilinear array of light modulating devices 60; alternately, cover prism 98 could simply be bonded to the cover glass. The cover prism 98 arrangement thereby removes the cause of undesirable cover reflection that would otherwise contribute to reduced contrast with light oblique to the surface of trilinear array of light modulating devices 60. As shown in FIG. 7, light enters and exits from trilinear array of light modulating devices 60 at close to normal angles with respect to surfaces of cover prism 98.

The invention has been described with reference to a preferred embodiment. However, it will be appreciated that variations and modifications can be effected by a person of ordinary skill in the art without departing from the scope of the invention. Thus, what is provided is a display apparatus and method using a trilinear electromechanical grating light modulator to provide high-quality imaging at lower cost.

PARTS LIST

10 Display system
24 Reflective segment
26 Transmissive region
29 Support
30 Retainer
46 Ribbon elements
48 Retaining elements
52 Patterned stop assembly
54 Stop
60 Trilinear array of light modulating devices
62 Patterned micromirror assembly
64 Control trace
66 Contact
68, 68r, 68g, 68b Driver chip; Driver chip, red; Driver chip, green; Driver chip, blue.
70, 70r, 70g, 70b Light source; Light source, red; Light source, green; Light source, blue.
72, 72r, 72g, 72b Spherical lens; Spherical lens, red; Spherical lens, green; Spherical lens, blue
74, 74r, 74g, 74b Cylindrical lens; Cylindrical lens, red; Cylindrical lens, green; Cylindrical lens, blue
75 Lens
77 Scanning mirror
82, 82r, 82g, 82b Turning mirror; Turning mirror, red; Turning mirror, green; Turning mirror, blue
85 Electromechanical grating light modulator
85r, 85g, 85b Electromechanical grating light modulator, red; Electromechanical grating light modulator, green; Electromechanical grating light modulator, blue
90 Display surface
92 Dichroic combiner
94 Dichroic combiner
93 Polarizing beamsplitter
96 Quarter-wave plate
98 Cover prism
100 Color combiner
110 Cross-order filter
185r, 185g, 185b Linear array of light modulating devices, red; Linear array of light modulating devices, green; Linear array of light modulating devices, blue

What is claimed is:

1. A display system, comprising:
   a) a light modulator having at least three independently addressable linear arrays of light modulating devices on a common substrate;
   b) at least one light source producing at least three colors of light for illuminating the at least three independently addressable linear arrays;
   c) a lens for creating line images of the at least three independently addressable linear arrays on a display surface;
   d) a scanning mirror for scanning the line images to create a two-dimensional image on the display surface; and
   e) driver circuitry for providing control signals to the independently addressable linear arrays according to a display data stream, wherein the display data stream is synchronized according to a spatial separation between the line images of the three independently addressable linear arrays.

2. The display system claimed in claim 1, wherein the at least three linear arrays of light modulating devices are independently addressable.

3. The display system claimed in claim 1, wherein the light modulating devices are electro-mechanical grating devices.

4. The display system claimed in claim 3, wherein the light modulating devices are GEMS devices.

5. The display system of claim 1 wherein the arrays of light modulating devices are flexible micromirror linear arrays.

6. The display system claimed in claim 1, wherein at least two of the at least three linear arrays differ in device resolution.

7. The display system claimed in claim 1, wherein the at least three colors include red, green, and blue.

8. The display system claimed in claim 7, wherein the linear array illuminated by the blue color provides a lower device resolution than the linear array illuminated by the green color.

9. The display system claimed in claim 1, wherein an electrical connection to one of the at least three linear arrays is interwoven with the light modulating devices of a different linear array.

10. The display system claimed in claim 1, wherein an electrical connection to one of the at least three linear arrays is made around a different linear array.

11. The display system claimed in claim 1, further comprising:
   e) a plurality of parallel reflective segments for directing illumination of the at least three colors of light onto the at least three linear arrays.

12. The display system claimed in claim 1, further comprising:
   e) a polarization beam splitter for directing illumination of the at least three colors of light onto the at least three linear arrays; and
   f) a quarter-wave plate for modifying polarization of the at least three colors of light.

13. The display system claimed in claim 1, further comprising:
   e) a cover prism residing atop the at least three linear arrays.

14. The display system claimed in claim 13, wherein the least three colors of light illuminate the at least three linear arrays at an oblique angle with respect to an orthogonal direction of the light modulator.

15. A display system having a trilinear array of electromechanical grating devices, comprising:
   a) a light modulator having three independently addressable linear arrays of electro-mechanical grating devices on a common substrate;
   b) at least one light source producing three colors of light for illuminating the three independently addressable linear arrays, wherein the three colors of light are red, green, and blue;
   c) a lens for creating line images of the three independently addressable linear arrays on a screen, wherein the line images comprise diffracted orders of light;
   d) an obstructing element for selecting the diffracted orders of light;
   e) a scanning mirror for sweeping the line images to create a two-dimensional image; and
   f) a driving circuit for providing control signals to the independently addressable linear arrays according to a display data stream, wherein the display data stream is synchronized according to a spatial separation between the line images of the three independently addressable linear arrays.

16. The display system claimed in claim 15, wherein the light modulating devices are GEMS devices.

17. The display system claimed in claim 15, wherein at least two of the three independently addressable linear arrays differ in device resolution.

18. The display system claimed in claim 15, wherein the independently addressable linear array illuminated by the blue color provides a lower device resolution than the independently addressable linear array illuminated by the green color.

19. The display system claimed in claim 15, wherein an electrical connection to one of the three independently addressable linear arrays is interwoven with the electromechanical grating devices of a different independently addressable linear array.

20. The display system claimed in claim 15, wherein an electrical connection to one of the three independently addressable linear arrays is routed around a different independently addressable linear array.

21. The display system claimed in claim 15, wherein the obstructing element includes a plurality of parallel reflective segments that also direct illumination of the three colors of light onto the three independently addressable linear arrays.

22. The display system claimed in claim 15, further comprising:
   f) a polarization beam splitter for directing illumination of the at least three colors of light onto the three independently addressable linear arrays; and
   g) a quarter-wave plate for modifying polarization of the three colors of light.

23. The display system claimed in claim 15, further comprising:
   f) a cover prism residing atop the three independently addressable linear arrays.

24. The display system claimed in claim 23, wherein the three colors of light illuminate the three independently addressable linear arrays at an oblique angle with respect to an orthogonal direction of the light modulator.

25. A method for displaying a two-dimensional image on a display surface, comprising the steps of:
   a) simultaneously providing three colors of light to a light modulator having three independently addressable linear arrays of light modulating devices on a common substrate;
   b) creating line images of the three independently addressable linear arrays on the display surface;
   c) providing an image data stream to each of the three independently addressable linear arrays, wherein the image data stream is synchronized according to a spatial separation between the line images of the three independently addressable linear arrays;
   d) scanning the line images across the screen in coordination with the data stream to create the two-dimensional image.

26. The method claimed in claim 25, wherein the step of creating line images comprises the step of forming diffracted orders of light.

27. A method for displaying a two-dimensional image on a display surface, comprising the steps of:
   (a) directing, to each of three independently addressable linear arrays of light modulating devices on a common substrate, a color illumination beam;
   (b) modulating each of the three independently addressable linear arrays of light modulating devices according to an image data stream, forming three spatially separate line images thereby;
   (c) scanning the three line images toward the display surface to form the two-dimensional image thereon;
   (d) wherein the step of modulating comprises the step of synchronizing the image data stream according to the distance between the spatially separate line images.

28. The display system claimed in claim 1, wherein the at least three colors of light, for illuminating the at least three independently addressable linear arrays, strikes the independently addressable linear arrays at a normal incidence with respect to the independently addressable linear arrays.

* * * * *